United States Patent
Nishino et al.

(10) Patent No.: US 7,310,717 B2
(45) Date of Patent: Dec. 18, 2007

(54) DATA TRANSFER CONTROL UNIT WITH SELECTABLE TRANSFER UNIT SIZE

(75) Inventors: Tatsuo Nishino, Kodaira (JP); Toru Ichien, Higashiyamato (JP); Gou Teshima, Kodaira (JP); Hiromichi Ishikura, Kodaira (JP); Jyunji Ishikawa, Higashiyamato (JP)

(73) Assignees: Renesas Technology Corp., Tokyo (JP); Renesas Northern Japan Semiconductor, Inc., Hokkaldo (JP); Hitachi Engineering Co., Ltd., Ibaraki (JP)

( * ) Notice: Subject to any disclaimer, the term of this patent is extended or adjusted under 35 U.S.C. 154(b) by 303 days.

(21) Appl. No.: 10/453,545

(22) Filed: Jun. 4, 2003

(65) Prior Publication Data

US 2003/0236941 A1  Dec. 25, 2003

(30) Foreign Application Priority Data

Jun. 21, 2002  (JP)  ............................. 2002-181073

(51) Int. Cl.
*G06F 13/14*  (2006.01)
(52) U.S. Cl. ...................... 711/165; 710/33; 710/34; 710/35
(58) Field of Classification Search ............... 711/104; 710/260, 33–35, 60, 165; 712/225
See application file for complete search history.

(56) References Cited

U.S. PATENT DOCUMENTS

| 4,758,899 | A  | * | 7/1988 | Tsukiyama | .................... 360/8 |
| 6,578,095 | B1 | * | 6/2003 | Tanaka et al. | ............... 710/100 |
| 6,763,401 | B2 | * | 7/2004 | Hayashi et al. | ................ 710/22 |
| 6,901,465 | B2 | * | 5/2005 | Kamihara et al. | ........... 710/100 |

FOREIGN PATENT DOCUMENTS

| JP | 3-134750 | 6/1991 |
| JP | 11-85670 | 3/1999 |
| JP | 2001-154977 | 6/2001 |

* cited by examiner

*Primary Examiner*—Matthew Kim
*Assistant Examiner*—Hetul Patel
(74) *Attorney, Agent, or Firm*—Miles & Stockbridge P.C.

(57) ABSTRACT

A data processor including a central processing unit and a data transfer control unit is disclosed. The data transfer control unit has an address register for storing a transfer address. The data transfer control unit transfers data according to a transfer unit size selected from a plurality of transfer unit sizes. If the address register contains an odd address as an initial value, the data transfer control unit transfers data according to a different transfer unit size that is smaller than the selected transfer unit size. If the data transfer control unit determines that a remaining quantity of data to be transferred is smaller than the selected transfer unit size, the selected transfer unit size is switched to a smaller transfer unit size selected from the plurality of transfer unit sizes.

15 Claims, 12 Drawing Sheets

FIG. 3

| BIT 7 | BIT 6 | BIT 5 | BIT 4 | BIT 3 | BIT 2 | BIT 1 | BIT 0 |
|---|---|---|---|---|---|---|---|
| RAM7SEL | RAM6SEL | RAM5SEL | RAM4SEL | RAM3SEL | RAM2SEL | RAM1SEL | RAM0SEL |

| ADDRESS MAP | INTERNAL RAM | | STATUS OF RAMACR AND INTERNAL RAM |
|---|---|---|---|
| H'FFA000 | 1K BYTES | | RAM7SEL 0: A RELEVANT AREA IS AN INTERNAL RAM AREA<br>1: A RELEVANT AREA IS A DMAC DATA BUFFER AREA |
| | 1K BYTES | | RAM6SEL 0: A RELEVANT AREA IS AN INTERNAL RAM AREA<br>1: A RELEVANT AREA IS A DMAC DATA BUFFER AREA |
| | 1K BYTES | | RAM5SEL 0: A RELEVANT AREA IS AN INTERNAL RAM AREA<br>1: A RELEVANT AREA IS A DMAC DATA BUFFER AREA |
| | 1K BYTES | | RAM4SEL 0: A RELEVANT AREA IS AN INTERNAL RAM AREA<br>1: A RELEVANT AREA IS A DMAC DATA BUFFER AREA |
| H'FFB000 | 1K BYTES | | RAM3SEL 0: A RELEVANT AREA IS AN INTERNAL RAM AREA<br>1: A RELEVANT AREA IS A DMAC DATA BUFFER AREA |
| | 1K BYTES | | RAM2SEL 0: A RELEVANT AREA IS AN INTERNAL RAM AREA<br>1: A RELEVANT AREA IS A DMAC DATA BUFFER AREA |
| | 1K BYTES | | RAM1SEL 0: A RELEVANT AREA IS AN INTERNAL RAM AREA<br>1: A RELEVANT AREA IS A DMAC DATA BUFFER AREA |
| | 1K BYTES | | RAM0SEL 0: A RELEVANT AREA IS AN INTERNAL RAM AREA<br>1: A RELEVANT AREA IS A DMAC DATA BUFFER AREA |
| H'FFA000 | | | |

DATA TRANSFER CONTROL UNIT WITH SELECTABLE TRANSFER UNIT SIZE

BACKGROUND OF THE INVENTION

The present invention relates to a data processor including a central processing unit and a data transfer control device, and more particularly to technology effectively applied to data block transfer (burst transfer).

The Japanese Unexamined Patent Publication No. 2001-154977 describes a data transfer controller having dual address mode. The data transfer controller has buffers of plural stages and a counter, and includes a data buffer circuit that can input and output data in the first in, first out mode in response to counting operation of the counter. Since the data buffer circuit has buffers of plural stages, in dual address mode, with the number of stages of buffers as an upper limit, data can be continuously read from a transfer source address and stored in the data buffer circuit, and the stored data can be continuously written to a transfer destination address. In the dual address mode, a read and a write may not be alternately performed. For this reason, data transfer efficiency can be increased in SDRAM (synchronous DRAM) and other devices capable of continuous data input-output operation such as burst access during which memory cells with common row addresses are continuously accessed while column addresses thereof are sequentially switched.

Japanese Unexamined Patent Publication No. Hei 3(1991)-134750 describes technology for supporting single mode and page mode when a DRAM controller is provided with a memory capable of holding plural pieces of word data. Japanese Unexamined Patent Publication No. Hei 11(1999)-85670 describes a microcomputer in which DMAC is provided at a preceding stage of a bus controller and the need for DMAC buffer is eliminated.

The inventor has found the following problems as a result of further investigation of DMAC (Direct Memory Access Controller). First, when USB (universal serial bus) interface is to be used for data transfer, if DMAC attempts to read the FIFO buffer beyond the empty state thereof, the value of address pointer of the FIFO buffer may be destroyed.

Second, when transfer addresses are odd addresses or the number of pieces of data to be transferred is odd, transferring all the data on a byte basis, which is a minimum unit of data transfer, would deteriorate data efficiency.

SUMMARY OF THE INVENTION

An object of the present invention is to provide a data processor that can increase the efficiency of block data transfer without little increasing physical circuit scales.

Another object of the present invention is to provide a data processor that can eliminate contradiction between continuous data transfer count by DMAC and continuous data transfer count permitted by peripheral circuits.

Another object of the present invention is to provide a data processor that can provide for contradiction between the number of pieces of data to be transferred and transfer units, and data transfer to odd addresses.

The above-described objects and other objects, and novel characteristics of the present invention will become apparent from the description of this specification and the accompanying drawings.

Representative examples of the invention disclosed in this patent application will be briefly described below.

[1-1] A data processor according to the present invention includes the following components in one semiconductor chip: a central processing unit (3); a data transfer control device (10); and a random access memory (6) accessible by the central processing unit and the data transfer control device. The data transfer control device can perform data transfer control that repeats data read from a transfer source a plural number of times, writes the read data to the random access memory, successively reads data written to the random access memory, and writes the read data to a transfer destination address. The central processing unit can programmably specify areas of the random access memory used for the data transfer control.

As described above, since the data transfer control device uses the random access memory accessible by the central processing unit as a buffer area for temporarily storing read data in dual address transfer, it does not need to have a dedicated FIFO buffer and the like in itself. Since a buffer area allocated to the random access memory or its size is programmable by the central processing unit, capacity necessary to the system may be allocated to the buffer to avoid conflict with a work area by the central processing unit.

[1-2] A data processor of a different aspect of the present invention includes the following components in one semiconductor chip: a central processing unit; a data transfer control device; and a random access memory accessible by the central processing unit and the data transfer control device. The data transfer control device, in data transfer control specifying a transfer source address and a transfer destination address, specifies a buffer write address for writing read data from the transfer source to the random access memory, in parallel with specification of a read address for the transfer source, and specifies a buffer read address for reading data to be written to the transfer destination from the random access memory, in parallel with specification of a write address for the transfer destination.

As described above, since the random access memory accessible by the central processing unit is used as a buffer area for temporarily storing read data in dual address transfer, the data transfer control device does not need to have a dedicated FIFO buffer and the like in itself.

Address specification for a transfer source or transfer destination is made in parallel with specification of buffer write address or buffer read address for the random access memory. This means that conflict of both addresses is avoided. For example, there are separately provided first address signal lines used to transmit address signals of a read address for the transfer source and address signals of a write address for the transfer destination, and second address signal lines used to transmit address signals of the buffer write address and address signals of the buffer read address. As a first embodiment, the first address signal lines are a bus (2A) included in a common internal bus to which the random access memory and the central processing unit are coupled, and the second address signal lines are a buffer address bus (50) coupled to the random access memory. In this case, a transfer source address and a transfer destination address may be combined inside or outside the data processor. As a second embodiment, the first address signal lines are an address bus (26) for the data transfer control device, and the second address signal lines are the bus (2A) included in the common internal bus to which the random access memory and the central processing unit are coupled. In this case, circuits connected to a bus other than the common internal bus must be used as circuits of transfer source and transfer destination. This is because an access address signal for the transfer source or transfer destination and a buffer access signal for the random access memory conflict on the common internal bus.

The data transfer control device, when performing data transfer from a transfer source to a transfer destination a plural number of times, can perform data transfer control that repeats data read from the transfer source a plural number of times, writes the read data to the random access memory, successively reads data written to the random access memory, and writes the read data to the transfer destination address. If circuits of the transfer source and transfer destination are capable of memory operation in burst mode, a read an a write need not be alternately performed, so that block transfer of data can be efficiently performed.

The data transfer control device includes first control register means (40) for enabling the central processing unit to programmably specify a repetition count of data transfer in the data transfer control, and second control register means (41) for enabling the central processing unit to programmably specify areas of the random access memory used for the data transfer control. Thereby, the flexibility of data block transfer is increased.

[1-3] A data processor according to one embodiment of the present invention includes the following components in one semiconductor chip: a central processing unit (3); a data transfer control device (10); a random access memory (6) accessible by the central processing unit and the data transfer control device; a bus control circuit (9) for controlling internal and external buses in response to access instructions from the central processing unit and the data transfer control device; an internal bus (2) shared among the central processing unit, the data transfer control device, the random access memory, and the bus control circuit; and a buffer address bus (50) for connecting the bus control circuit and the random access memory independently of the internal bus. The data transfer control device includes: a counter means (33); a transfer control channel (34) for outputting the address signals of transfer source and transfer destination to the internal bus; and a control circuit (35), wherein, when controlling block transfer of data, the control circuit updates the addresses of the transfer source and transfer destination by using count values of the counter means, and instructs the bus control circuit to access the random access memory through the buffer address bus. The bus control circuit, when instructed to access the random access memory, uses a count value of the counter means to output a buffer address signal to the buffer address bus, writes read data from the transfer source to the random access memory in parallel with read transfer control using the internal bus for the transfer source, and reads data to be written to the transfer destination from the random access memory in parallel with write transfer control using the internal bus for the transfer destination.

A data processor according to another embodiment of the present invention includes the following components in one semiconductor chip: a central processing unit; a data transfer control device; a random access memory accessible by the central processing unit and the data transfer control device; a bus control circuit for controlling internal and external buses in response to access instructions from the central processing unit and the data transfer control device; an internal bus (2) shared among the central processing unit, the data transfer control device, the random access memory, and the bus control circuit; and a DMA address bus (26) for connecting the bus control circuit and the data transfer control device independently of the internal bus. The data transfer control device includes: a counter means; a transfer control channel for outputting the address signals of transfer source and transfer destination to the DMA address bus; and a control circuit, wherein, when controlling block transfer of data, the control circuit updates the addresses of the transfer source and transfer destination by using count values of the counter means, and instructs the bus control circuit to access the random access memory through the internal bus. The bus control circuit, when instructed to access the random access memory, uses a count value of the counter means to output a buffer address signal to the internal bus, writes read data from the transfer source to the random access memory in parallel with read transfer control using the DMA address bus for the transfer source, and reads data to be written to the transfer destination from the random access memory in parallel with write transfer control using the DMA address bus for the transfer destination.

[2] A data processor of another aspect of the present invention includes a central processing unit, a peripheral circuit (15) including a data buffer; and a data transfer control device. When performing data transfer control with the peripheral circuit as a data transfer source, the data transfer control device determines the number of pieces of data stored in the data buffer of the peripheral circuit and performs the data transfer control in a range that does not exceed the number of pieces of data.

Like a USB interface module, for a peripheral circuit in which an attempt to read the FIFO buffer beyond the empty state thereof may destroy the value of address pointer of the FIFO buffer, the adoption of the above-described means would make it possible to prevent address pointer values from being destroyed.

[3] A data processor of another aspect of the present invention includes a central processing unit and a data transfer control device. The data transfer control circuit uses a transfer unit having a minimum number of pieces of data when a transfer target address is an odd address; when the transfer target address is an even address, it reduces the number of pieces of data of a transfer unit according to a state in which the transfer target address does not match an address interval of the transfer unit. Furthermore, a data processor according to the same aspect includes a central processing unit and a data transfer control device, wherein the data transfer control device determines the number of pieces of data to be transferred, and when the number of pieces of the data becomes smaller than the number of pieces of data of the transfer unit, switches to a transfer unit having a smaller number of pieces of data in the course of data transfer.

According to the data processor of the above aspect, a situation can be prevented in which, when a transfer target address begins at a midway address such as an odd address, or when the number of pieces of data to be transferred is an odd byte, data transfer efficiency would deteriorate if all the data were transferred on a byte basis, which is a minimum unit of data transfer.

[4] When the number of pieces of data to be transferred is odd, the following alternative may be adopted. In a data processor including a central processing unit and a data transfer control device, the data transfer control device determines that the number of pieces of remaining data to be transferred is smaller than the number of pieces of data of a transfer unit, and requests an interrupt, and the central processing unit, in response to the interrupt request, for remaining data transfer, switches to a transfer unit having a smaller number of pieces of data. Switching of transfer units may be controlled by the data transfer control device.

Alternatively, the central processing unit may switch transfer units to control remaining data transfer.

BRIEF DESCRIPTION OF THE DRAWINGS

FIG. 3 is a register format diagram of RAM area control register;

FIG. 4 is a diagram for explaining the capacity and layout of RAM areas usable as data buffers of EXDMAC;

DESCRIPTION OF THE PREFERRED EMBODIMENTS

Figure 1:
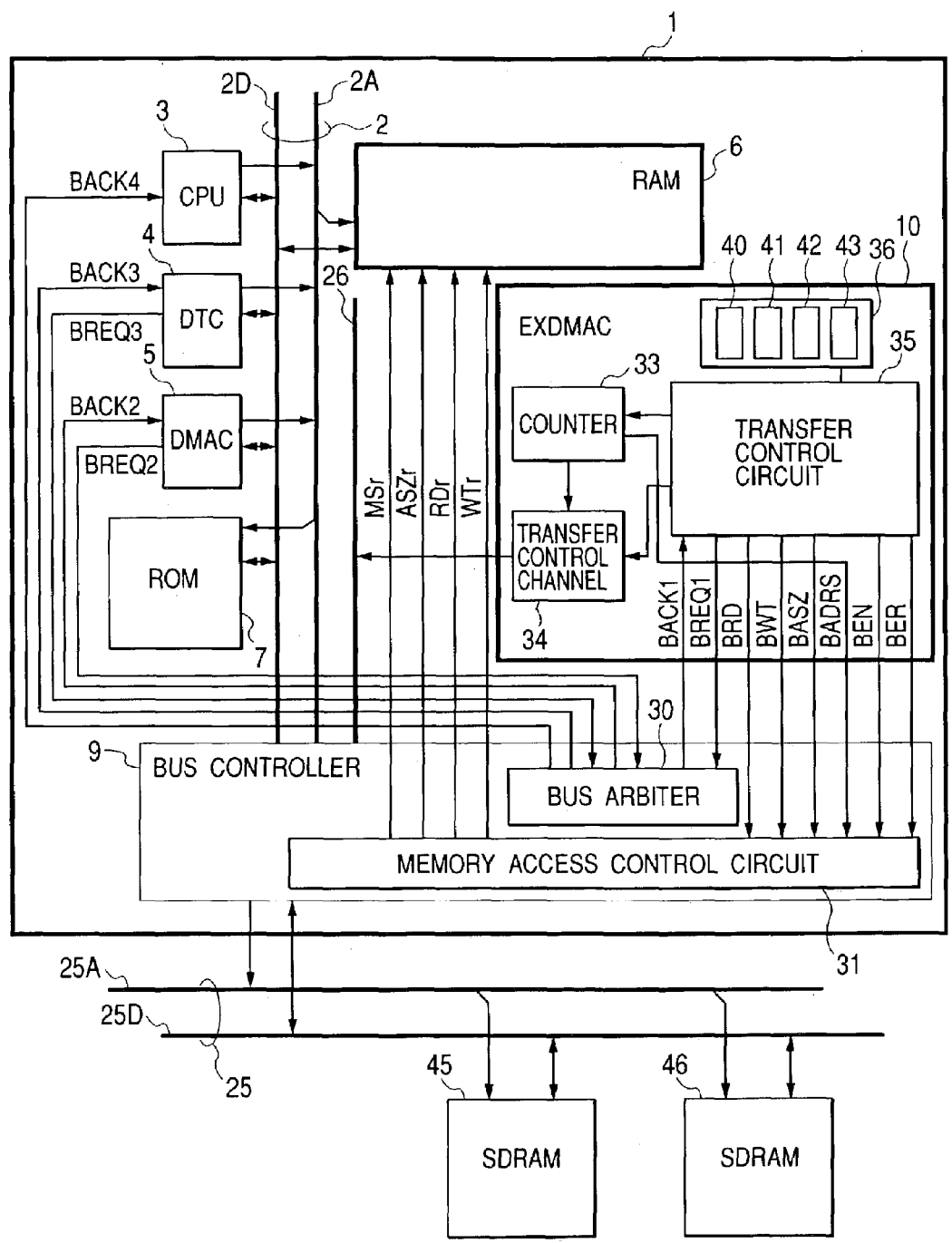
FIG. 1 is a block diagram showing the details of EXDMAC and a bus controller of a data processor according to the present invention.
Figure 2:
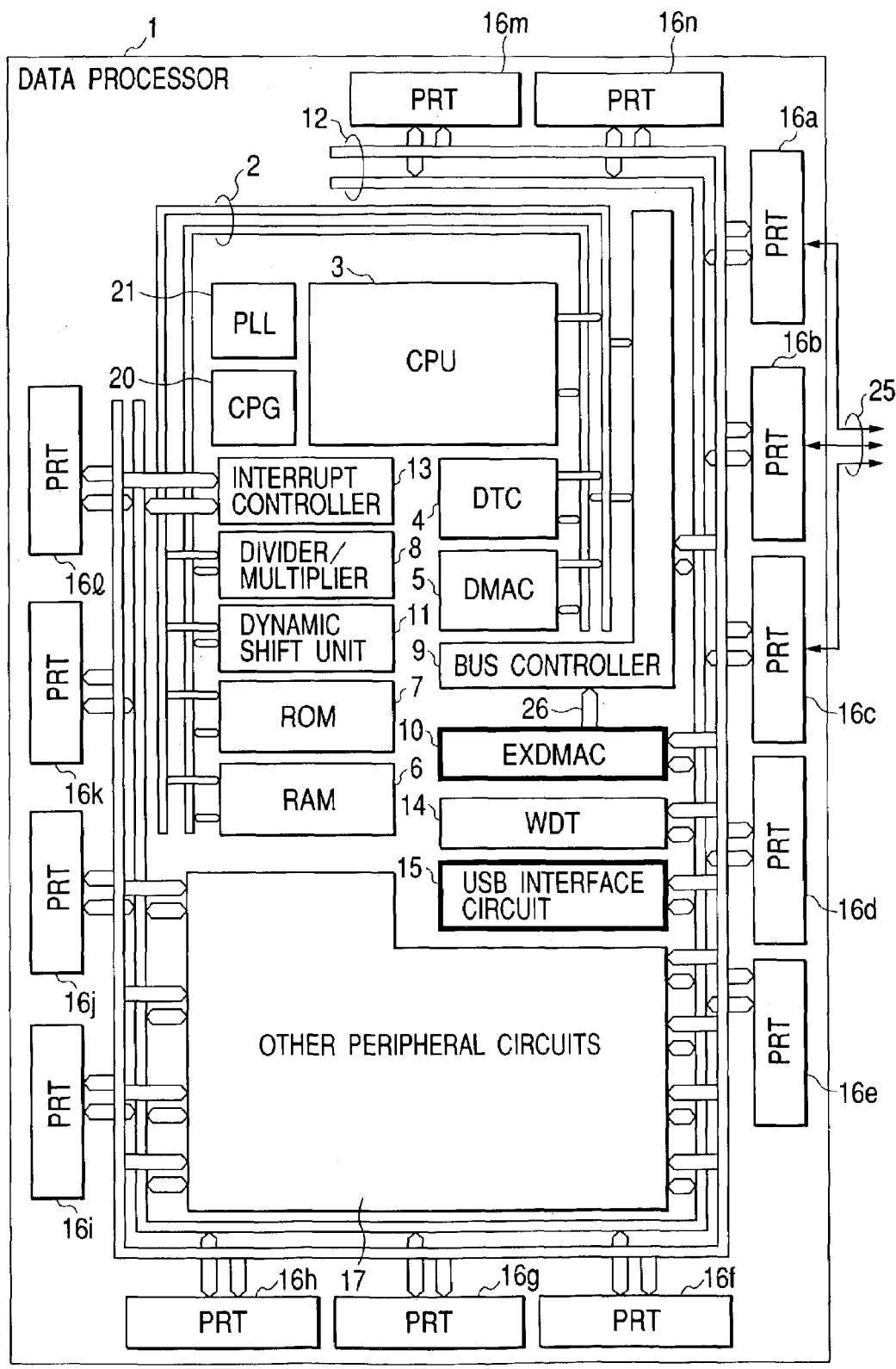
FIG. 2 is a block diagram schematically showing the whole data processor according to the present invention.

FIG. 2 schematically shows the overall configuration of a data processor 1 of the present invention. A data processor 1 shown in FIG. 1 is formed on one semiconductor substrate (semiconductor chip) such as monocrystalline silicon by CMOS integrated circuit manufacturing technology, for example.

The data processor 1 includes: a central processing unit (CPU) 3 connected to an internal bus 2; a data transfer controller (DTC) 4; a data transfer control device (DMAC) 5; a read-only memory (ROM) 7, which is a program memory for storing processing programs and the like of the CPU 3; a random access memory (RAM) 6 used as a work area of the CPU 3 and to temporarily store data; a divider 8; a dynamic shift unit 11; and a bus controller 9. Another data transfer control device (EXDMAC) 10 is connected to the bus controller.

The internal bus 2 is interfaced with a peripheral bus 12 through the bus controller 9. To the peripheral bus 12 are connected, as peripheral circuits, the interrupt controller 13, a watchdog timer (WDT) 14, a USB interface circuit 15, input-output ports (PRT) 16a to 16n, and other peripheral circuits 17 such as a timer counter (TMR), a serial communication interface controller (SCI), and the like. The data processor further includes a clock generation circuit (CPG) 20, a PLL circuit 21, and the like.

Each of the internal bus and the peripheral bus 12 include a data bus, an address bus, and a control bus (control signal bus). The peripheral bus 2 is interfaced with an external bus 25 through the input-output ports 16a to 16c, and the internal bus 2 is interfaced with the peripheral bus 12 through the bus controller 9 and interfaced with the external bus 25 through the input-output ports (PRT) 16a to 16c. The other input-output ports 16d to 16n function as interface buffers for peripheral circuits.

In the data processor 1, bus master modules are the CPU 3, DTC 4, DMAC 5, and EXDMAC 10. The CPU 3 includes an instruction control part for fetching instructions from the ROM 5 and decoding the fetched instructions, and an execution part for performing operation processing using general registers and arithmetic logic circuits according to instruction decoding results by the instruction control part. The DMAC 5, data transfer conditions of which are initially set by the CPU 3 through the internal bus 2, controls data transfer in response to data transfer requests from the internal peripheral circuits and the like. The DTC 4 controls data transfer in response to data transfer requests from the internal peripheral circuits and the like, and obtains data transfer control conditions, referring to transfer control data of pointer structure stored in the RAM 6 and the like. Although there is no particular limitation, the EXDMAC 10 is positioned as a circuit for controlling data transfer between memories or a memory and an input-output circuit inside or outside the data processor 1, or data transfer between memories or a memory and an input-output circuit outside the data processor 1. Data transfer control conditions are set by the CPU 3 through the internal bus 2 and the peripheral bus 12. Although details will be given later, part of the RAM 6 is used as a data buffer for storing temporarily read data from transfer sources. In short, the EXDMAC 10 does not internally hold data read from a transfer source. Address signals outputted from the EXDMAC 10 to specify a transfer source and a transfer destination in data transfer control are transmitted to the peripheral bus and the external bus 25 via the bus controller 9 from the address bus 26, which is a DMA dedicated address bus.

When a reset signal is supplied to the data processor 1, on-chip circuit modules such as the CPU 3 are reset. When the reset state by the reset signal is freed, the CPU 3 perform the following: reads an instruction from a predetermined start address; starts program execution; according to it, fetches data from the RAM 6, for example; performs operations on the fetched data; and based on processing results, performs data input-output processing and the like with the outside using the USB interface circuit 15, thereby controlling various types of devices.

FIG. 1 shows the details of the EXDMAC 10 and the bus controller 9. As the internal bus 2, an internal address bus 2A and an internal data bus 2D are illustrated. As the external bus 25, there are illustrated an external address bus 25A and an external data bus 25D to which two SDRAMs 45 and 46 typically shown are connected. In the drawing, the peripheral bus 12, input-output ports 16a to 16n, and part of other circuit modules are omitted.

The bus controller 9 performs arbitration for competition of bus right requests among bus master modules CPU 3, DMAC 5, DTC 4, and EXDMAC 10, and external bus asters by the bus arbiter 30. BREQ1, BREQ2, BREQ3 are bus right request signals, and BACK1, BACK2, BACK3, and BACK4 are bus right approval signals. The bus right request signal and approval signals from the external bus master are omitted in the drawing.

The bus arbiter 30 performs arbitration for selectively granting bus right for bus right request signals (BREQ1, BREQ2, and BREQ3) from the bus master modules (DTC 4, DMAC 5, EXDMAC 10) except the CPU 3. Upon outputting a bus right request signal, a bus master module receives a bus right approval signal (one of BACK 1, BACK 2, and BACK 3) from the bus arbiter 30, obtains bus right, and starts the use of a bus. When a bus master module having used the bus terminates the use of the bus, the bus arbiter 30 outputs the bus right approval signal BACK 4 to the CPU 3. Thereby, the CPU 3 obtains bus right and performs data processing through the bus. Such control results in the bus arbiter 30 preferentially granting bus right to the CPU 3, enabling the CPU 3 to perform data processing at high speed.

On the other hand, although not illustrated, a configuration may be formed in which the bus arbiter 30 outputs a bus right request signal to the CPU 3. This configuration is effective for a multi-CPU configuration in which central processing units (CPU) other than the CPU 3 exist within the chip. That is, when another central processing unit outputs a bus right request signal to the bus arbiter 30, the bus arbiter 30 outputs a bus request signal to the CPU 3 to free bus right from the CPU 3. Thereafter, the bus arbiter 30 outputs a bus right approval signal to the another central processing unit. When data processing of the another central processing unit terminates, the bus arbiter 30 outputs the bus right approval signal BACK4 to the CPU 3. Thereby, bus right is returned to the CPU 3. In this case, since bus right can be selectively granted to other central processing units, data processing of the CPU 3 and data processing of the other central processing units can be effectively controlled.

A bus master module to which bus right is granted by the arbitration outputs a bus command such as an address signal and an access control signal. The bus controller 9 decides access cycle count, data width, and the like, based on the contents of the bus command, and performs bus access control, memory access control, and the like. For the purpose of the bus access control, memory access control, and the like, information such as device access data size and access speed mapped for each address area is initially set by the CPU 3 immediately after power-on reset. According to an area of an access address supplied from the internal address bus 2A, and the like, bus control (device address output, data access size, weight state insertion, etc.) for external buses and the like is performed.

In FIG. 1, a memory access control circuit 31 for the RAM 6 is typically shown as a circuit for performing memory access control. The memory access control circuit 31, in response to an access request from a circuit approved for bus right, outputs RAM access control signals such as module selection signal MSr, access size signal ASZr, read signal RDr, and write signal WTr to the RAM 6. An address signal is supplied through address bus 2A and the data is notified to data bus 2D.

The EXDMAC 10 includes: a counter 33; a transfer control channel 34 for outputting address signals of transfer source and transfer destination to the DMA dedicated address bus 26; a transfer control circuit 35; and a control register part 36.

The control register part 36 in which various data transfer control conditions can be programmably specified by the CPU 3 includes: a transfer count register 40 for specifying a transfer count in data block transfer; a RAM area control register (RAMACR) 41 for specifying whether each of plural areas of RAM is used as an internal memory or as one of data buffers of EXDMAC; a source start address register 42; a destination start address register 43; and the like. The RAM area control register 41 has a format shown in FIG. 3, and has an 8-bit control information RAM0SEL to RAM7SEL. When the storage capacity of RAM is 8K bytes, each of the 8-bit control information RAM0SEL to RAM7SEL, as shown in FIG. 4, represents by a logical value 0 that a corresponding 1K-byte area of RAM is used as an internal RAM, and by a logical value 1 that a corresponding 1K-byte area of RAM is used as a data buffer of EXDMAC. This makes the capacity and layout of RAM area usable as EXDMAC data buffer programmable.

The transfer control channel 34 includes: a source address register for specifying a transfer source address (source address); a destination address register for specifying a transfer destination address (destination address); a transfer count register for counting transfer count; an address adder; and the like. An initial value of a source address (destination address) is initially set by the CPU 3 through the peripheral bus 12, and is incremented by adding a count value of the counter 30 to an immediately preceding source address (destination address) by the adder. An initial value of a source address may be set in the start address register of the control register part 36 before being loaded into the source address register (destination address register).

The transfer control circuit 35 asserts the bus right request signal BREQ1 to the bus arbiter 30, obtains bus right by the bus right approval signal BACK1 asserted in response to it, and starts data transfer control. Thereby, when data is block-transferred, the transfer control circuit 35 directs the transfer control channel 34 to specify addresses for accessing a transfer source and a transfer destination. In parallel to it, the transfer control circuit 35 directs the memory access control circuit 31 to activate the RAM 6 as a data buffer, read data from the transfer source and successively write the read data to the RAM 6 in parallel with the data reading, and successively read data written to the RAM 6 and write the data to the transfer destination.

Specifically, when controlling the above-described data block transfer, the transfer control circuit 35, in parallel with access operation by the transfer control channel 34, directs the memory access control circuit 31 to assert the data buffer enable signal BEN to activate the RAM 6 as a buffer via the internal bus 2. How much the RAM 6 is used as a buffer is specified with buffer area information BER. Although there is no particular limitation, the buffer area information BER is control information RAM0SEL to RAM7SEL of the RAM area control register 41. An address for an area specified with the buffer area information BER is specified by the output of the counter 33 afforded to the memory access control circuit 31 as a buffer address BADRS. An access type for RAM access as buffer is afforded to the memory access control circuit 31 as buffer read signal BRD, buffer write signal BWT, and buffer access size signal BASZ. The memory access control circuit 31 recognizes the buffer control signals BER, BEN, BWT, and BRD inputted from the transfer control circuit 35; in response to one of them, outputs the memory control signals MSr, ASZr, RDr, and WTr to the RAM 6; and activates the RAM 6 as data buffer in parallel with access control over the transfer source and transfer destination.

For example, when the transfer control circuit 35 performs read operation for a transfer source, in parallel with it, each time data is read from a transfer source through the internal data bus 2D, the transfer control circuit 35 directs the memory access control circuit 31 to activate the RAM 6 as data buffer to repeatedly store read data in the RAM 6. Addressing for the RAM 6 is synchronized by using as the buffer address signal BADRS a count value resulting from increment or decrement of the counter 33 applied when a source address for a transfer source is updated. The memory access control circuit 31 can output an access address signal for a buffer area specified for the RAM 6 to the address bus 2A by successively adding the value of buffer address signal BADRS, with the start address of an area specified with the buffer area information BER as a starting point. After read operation for the transfer source is performed a predetermined number of times, when the transfer control circuit 35 performs write operation for the transfer destination through the transfer control channel 34, in parallel with this operation, the transfer control circuit 35 successively reads data stored in the buffer area of the RAM 6 and outputs data to be written to the data bus 2D. When access to the RAM 6 is switched from read to write, the counter 33 is reset to an initial value. Addressing for the RAM 6 is synchronized by using as the buffer address signal BADRS a count value resulting from increment or decrement of the counter 33 added when a destination address for a transfer destination is updated. The memory access control circuit 31 outputs an access address signal for a buffer area specified for the RAM 6 to the address bus 2A by successively adding the value of buffer address signal BADRS, with the start address of an area specified with the buffer area information BER as a starting point.

Figure 5:
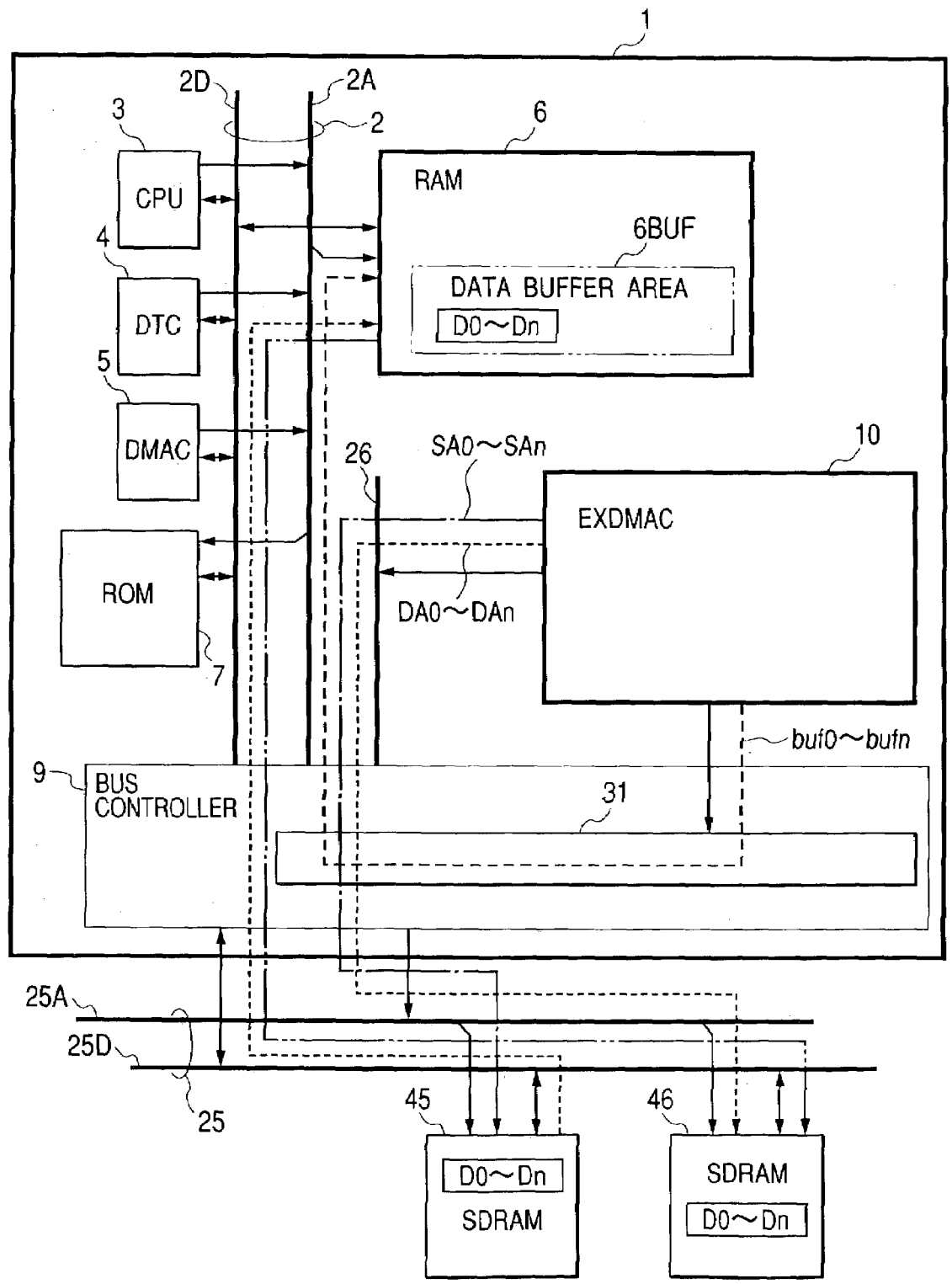
FIG. 5 is a block diagram showing a flow of address signals and data by data block transfer control by EXDMAC.

FIG. 5 shows the flow of address signal and data by data block transfer control by the EXDMAC 10. It is assumed that a transfer source is SDRAM 45 and a transfer destination is SDRAM 46. Transfer source data of SDRAM 45 is D0 to Dn. A source read address signal for SDRAM 45 is SA0 to SAn, and a destination address signal for SDRAM 45 is DA0 to DAn. A buffer access address signal for a data buffer area 6BUF of the RAM 6 is buf0 to bufn, which are common to both read and write.

The size and layout of the data buffer area 6BUF on the RAM 6 are programmably decided by the value of the control information RAM0SEL to RAM7SEL. The area and its size may be decided in a range that does not conflict with a work area of the CPU 3. If the data buffer is relatively large, during transfer of block data, the number of read operations for the transfer source and the number of write operations for the transfer destination can be maximized.

Figure 6:
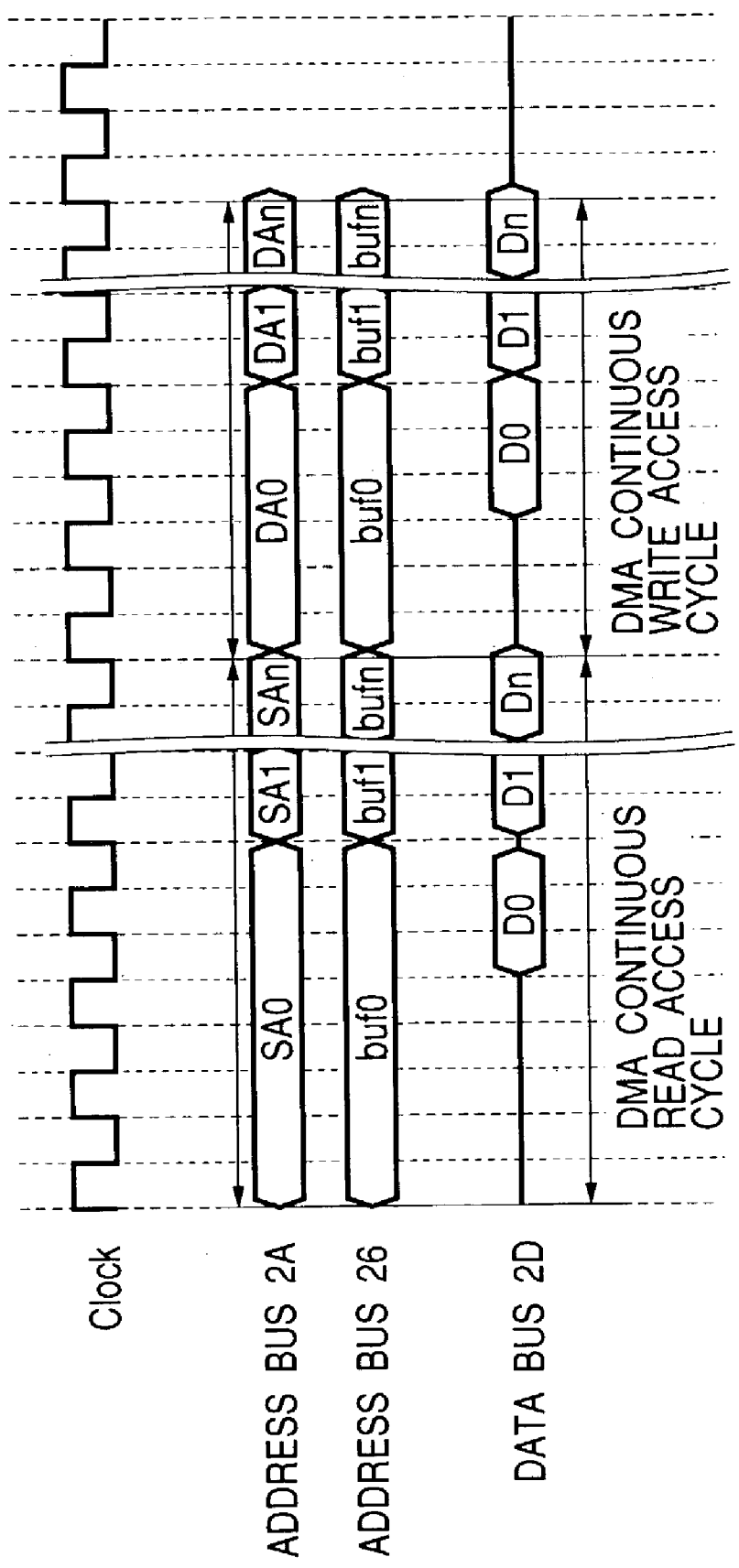
FIG. 6 is a timing chart showing operation timing of data block transfer shown in FIG. 5.

FIG. 6 shows operation timing of data block transfer shown in FIG. 5. In read operation for the transfer source, the output of source address signals SAO to SAn to the address bus 2A and the output of write address signals buf0 to bufn of the data buffer area 6BUF to the output and address bus 26 are paralleled, and data DO to Dn from the transfer source are successively and continuously stored in the data buffer area 6BUF of RAM 6. At this time, the leading source address SAO substantially specifies a row address and a column address for SDRAM 45, and following source addresses SA1 to SAn are regarded as address signals for specifying the SDRAM 45 with different column addresses for the same row address as the start address. Therefore, the SDRAM 45 does not require word line selection operation during reading of source data of a second and following source addresses, and allows the data to be successively read at shorter cycles than during reading of the leading data. This is also the same for writing; the leading destination address DAO substantially specifies a row address and a column address for SDRAM 46, and following destination addresses DA1 to DAn are regarded as address signals for specifying the SDRAM 46 with different column addresses for the same row address as the start address. Therefore, the SDRAM 46 does not require word line selection operation during writing of source data of a second and following destination addresses, and allows the data to be successively written at shorter cycles than during writing of the leading data. It is the most efficient to continuously perform read operation of transfer source and write operation of transfer destination in such short cycles with a transfer count as an upper limit as far as the storage capacity of the data buffer area 6BUF permits. Since the storage capacity of the data buffer area 6BUF is programmable in this sense, flexibility is guaranteed in that an optimum storage capacity can be allocated to a data buffer area according to a system to which the data processor is applied.

Figure 7:
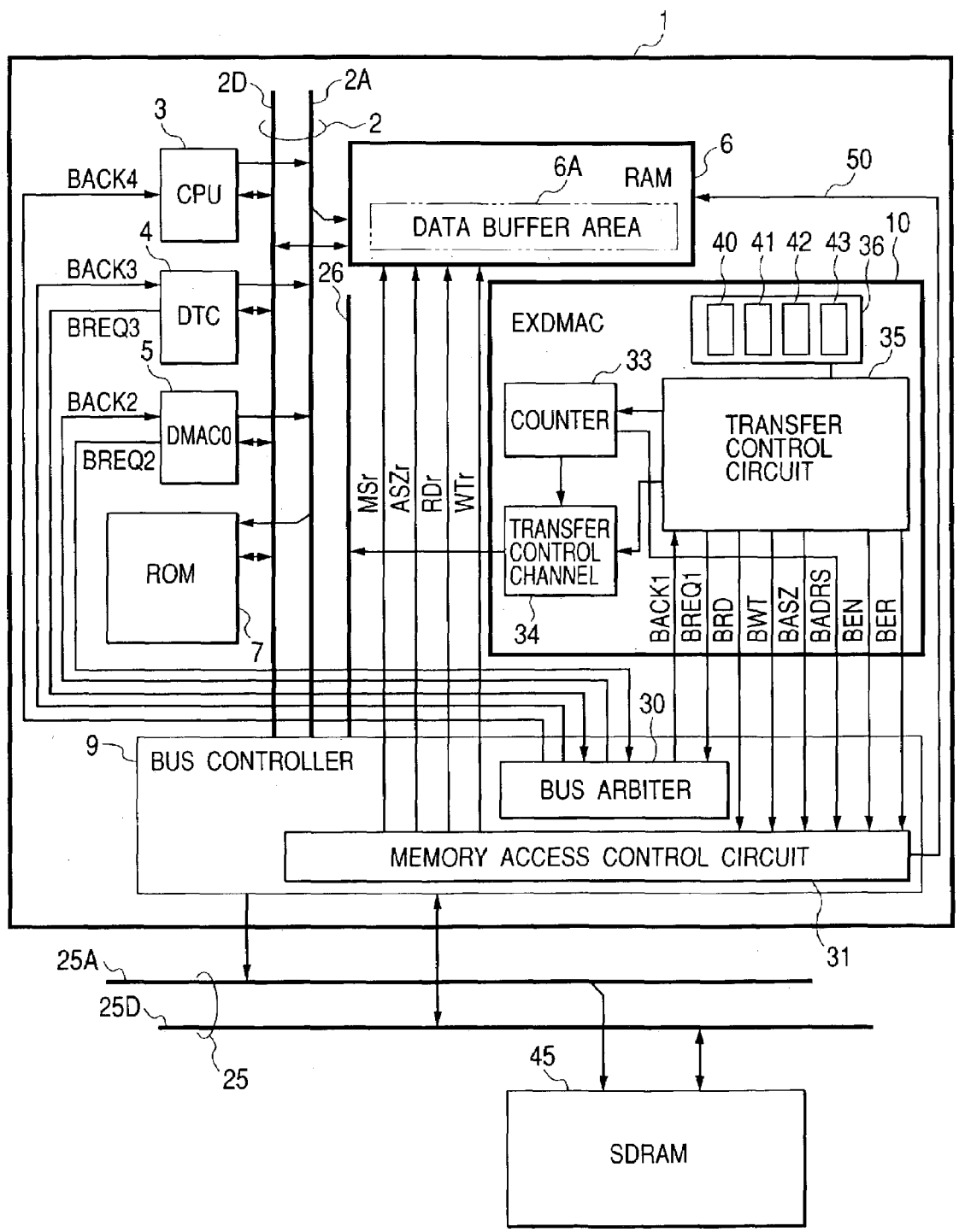
FIG. 7 is a block diagram showing a second example of a data processor according to the present invention.

FIG. 7 shows a second example of the data processor according to the present invention. The configuration of a data processor 1A shown in FIG. 7 is the same as those in FIGS. 1 and 2, except that the transfer control channel 34 outputs an access address signal to the internal bus 2A and an access address signal for the data buffer area 6BUF of the RAM 6 is supplied to the RAM 6 from the memory control circuit 31 through an address bus (buffer address bus) 50 exclusively used for buffer access. In short, a method of generating a source address signal, destination address signal, and buffer address signal is the same as in the case of FIG. 1, except that a route for supplying an address signal to the RAM 6 is different. In this example, the RAM 6 has two address input ports, and since both the address input ports are not used in parallel, an input selection circuit for exclusively connecting any one of the address input ports to the inside may be provided. The module selection signal may be provided with two bits so that a function for selecting the address input ports is assigned to one of the bits. When buffer enable is indicated by the data buffer enable signal BEN, the memory access control circuit 31 may select address input from the address bus 50. The constitution of the data processor is the same as that FIG. 1 in other points; detailed descriptions are omitted.

According to the data processor 1A of FIG. 7, the transfer control circuit 35, when controlling block transfer of data, updates the addresses of transfer source and transfer destination by using a count value of the counter 33, and directs the bus controller 9 to access the RAM through the buffer address bus 50. Upon receipt of this direction, the memory access control circuit 31 of the bus controller 9 outputs a buffer address signal to the buffer address bus 50 by using a count value of the counter 33, and writes read data from the transfer source to the data buffer area 6BUF of the RAM 6, in parallel with read transfer control over the transfer source by use of the internal bus 2. Furthermore, in parallel with write transfer control over the transfer destination by use of the internal bus 2, the memory control circuit 31 performs bus control to output data to be written to the transfer destination to the data bus 2D from the data buffer area 6BUF. This produces the same effect as the data processor 1 of FIG. 1 during data block transfer.

Figure 8:
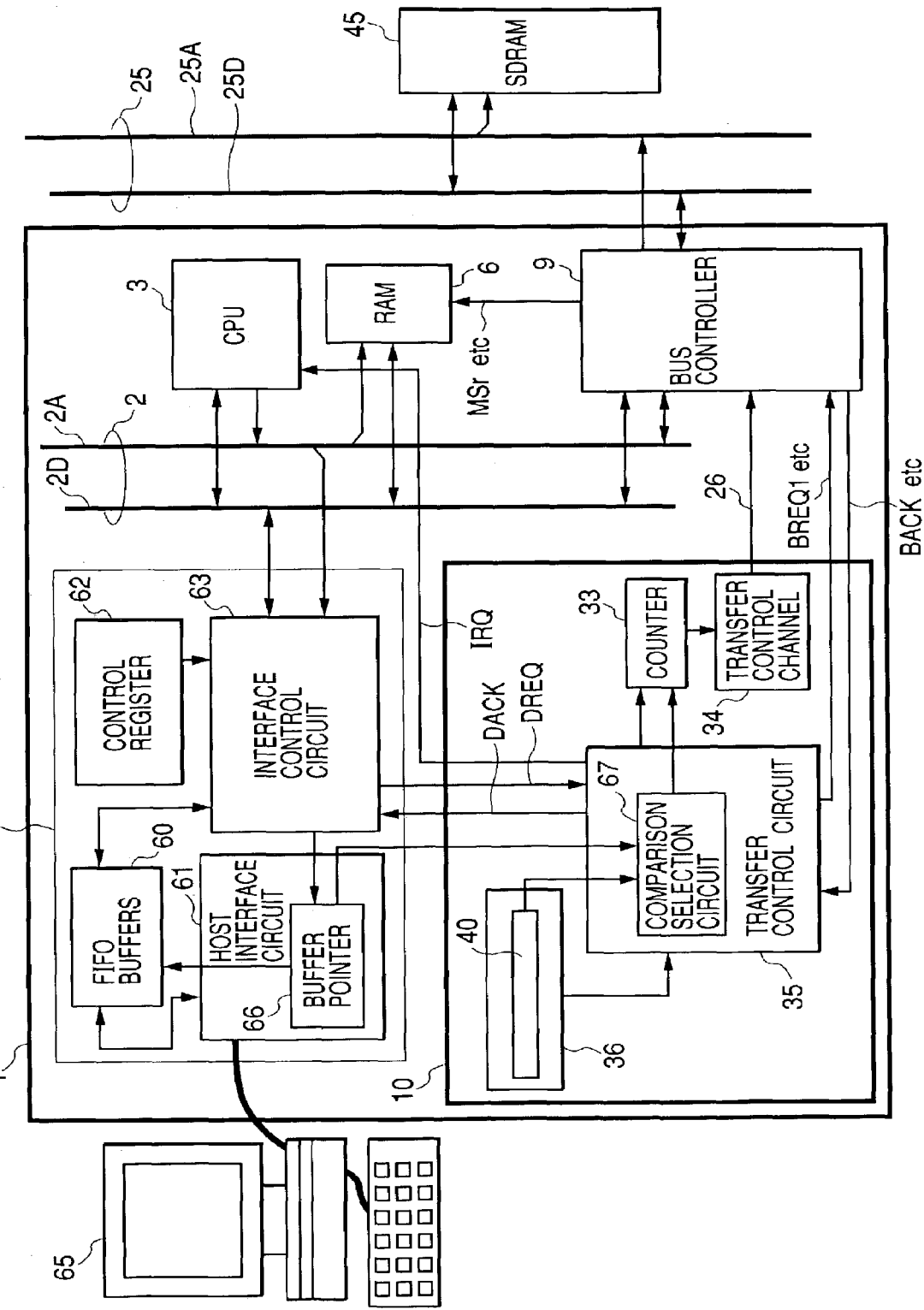
FIG. 8 is a block diagram showing the details of the relationship between EXDMAC and a USB interface circuit in a data processor of FIG. 1.

FIG. 8 shows the details of the relationship between the EXDMAC 10 and USB interface circuit 15 in the data processor of FIG. 1.

The USB interface circuit 15 has FIFO buffer 60, host interface circuit 61, control register 62, and interface control circuit 63. The host interface circuit 61 controls serial data input and output with a host device 65. The transfer control circuit 35 outputs a signal BREQ1 and buffer control signals BER, BEN, BWT, and BRD, etc., to the bus controller 9, as shown in FIG. 1. The bus controller 9 outputs memory control signals MSr, ASZr, RDr, and WTr, etc. to the RAM 6, as shown in FIG. 1. Data to be inputted and outputted is temporarily stored in the FIFO buffer 60. Access control of FIFO buffer 60 is performed in buffer pointer 66. The buffer pointer 66 has read address pointer and write address pointer as a ring counter, and performs data read and write in FIFO form. The interface control circuit 63, which is coupled to the internal bus 2 and the EXDMAC 10, makes a request to the EXDMAC 10 for data transfer by a data transfer request signal DREQ when data is inputted and outputted to and from the internal bus 2, waits for the approval of the transfer request by a transfer acknowledge signal DACK, and then outputs data to be inputted and outputted to the data bus 2D or inputs it from the data bus 2D. Upon receipt of the data transfer request by the data transfer request signal DREQ, the EXDMAC 10 makes a request to the bus controller 9 for bus right by a bus right request signal BREQ1, waits for bus right to be granted by a bus right approval signal BACK1, and then approves the transfer request by the transfer acknowledge signal DACK. After awarding approval to the USB interface circuit 15 for the transfer request, the EXD-MAC 10 outputs a transfer address signal responding to the transfer request to the bus controller 9 from the transfer control channel 34, when data transfer, for example, from the SDRAM 45 to the USB interface circuit 15, and vice versa is started. At this time, as described previously, a part (data buffer area 6BUF) of the RAM 6 is used as a data buffer of the EXDMAC 10, and details are omitted.

When performing data transfer control with the USB interface circuit 15 as a data transfer source, the EXDMAC 10 checks the number of pieces of data held in the FIFO buffer of the USB interface circuit 15, and performs data transfer control in a range that does not exceed the number of pieces of data. The number of pieces of data denotes a multiple of a minimum unit of data access in the FIFO buffer; in the EXDMAC 10, it denotes a multiple or transfer count of a minimum unit of data transfer. The following description assumes that a data transfer unit in the EXD-MAC 10 is equal to the unit of data access in the FIFO buffer. For example, the transfer unit and access unit are represented in bytes, which are a minimum transfer unit and a minimum access unit, and the description is made on the assumption that the number of pieces of data and the transfer count are equal. For example, a comparison selection circuit 67 of the transfer control circuit 35 compares the number of pieces of stored data in FIFO buffer 60 managed by buffer pointer 66 and the setting value of the transfer count register 40. In the case that the latter exceeds the former, the former is preset as the initial value of counter 33; otherwise, the latter is preset as the initial value of counter 33. The transfer control circuit 35 performs control to repeat data transfer the preset number of times.

Figure 9:
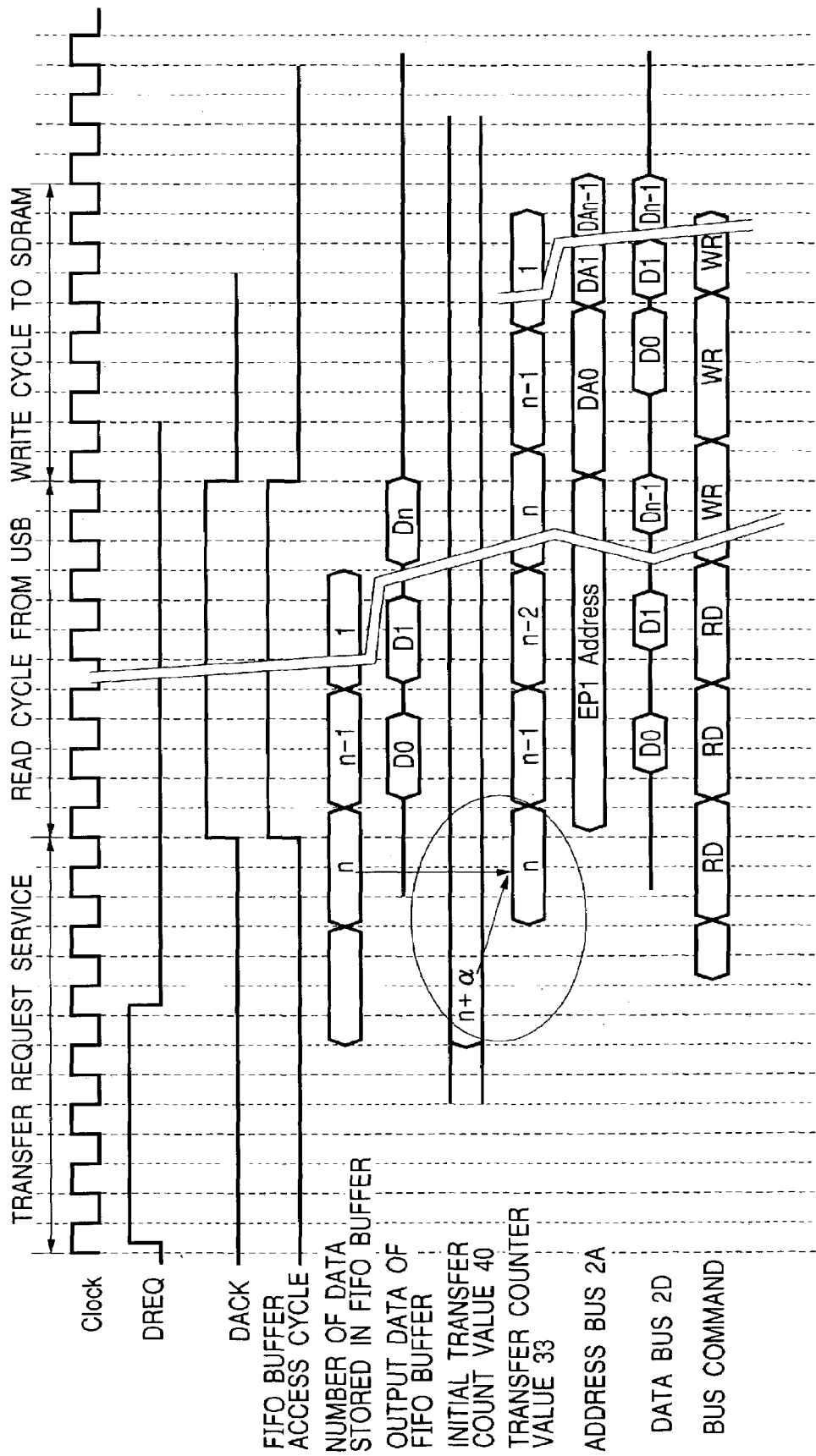
FIG. 9 is a timing chart showing operation timing of data block transfer from a USB interface circuit to SDRAM.

FIG. 9 shows operation timing of data block transfer from the USB interface circuit to the SDRAM. The number of pieces of data stored in buffer obtained from the buffer pointer 66 is "n", and the initial value of transfer count set in register 40 is "n+α". The comparison selection circuit 67 compares both, and loads "n" to the counter 33 as an initial value. The EXDMAC 10 supplies an address signal EP1 indicating the selection of a relevant module to the USB interface circuit 15, which is a transfer source, and thereby causes data to be successively outputted to the data bus 2D from the FIFO buffer 60. N number of pieces of outputted data D0 to Dn−1 are temporarily stored in the data buffer area 6BUF of RAM 6, as described previously. As a result, the number of read operations on the FIFO buffer does not exceed the number of pieces of data held in it. Accordingly, like a USB interface module, in a peripheral circuit in which an attempt to read the FIFO buffer beyond the empty state thereof may destroy the value of address pointer of the FIFO buffer, it is possible to prevent address pointer values from being destroyed. Next, in parallel with supplying the destination address signal DA0 to DAn−1 to the SDRAM 45, which is a transfer destination, the EXDMAC 10 reads the data D0 to Dn−1 from the data buffer area 6BUF of RAM 6 and outputs them to the data bus 2D, whereby the data D0 to Dn−1 are stored in the SDRAM 45.

In the EXDMAC 10 of FIG. 8, the transfer control circuit 35 checks the number of pieces of data to be transferred, indicated by the number of pieces of data held in the FIFO buffer 60. When the number of pieces of data becomes smaller than the data transfer unit, the EXDMAC 10 switches to a transfer unit having a smaller number of pieces of data in the course of data transfer. The number of pieces of data may be checked using a value of the buffer pointer 66 or a count value of the counter 33. Transfer units are, e.g., long word (32 bits), word (16 bits), and byte (8 bits). Switching of a transfer unit changes an increment of the counter 33, transfer data size, access size for data buffer area 6BUF of the RAM 6, and the like.

Figure 10:
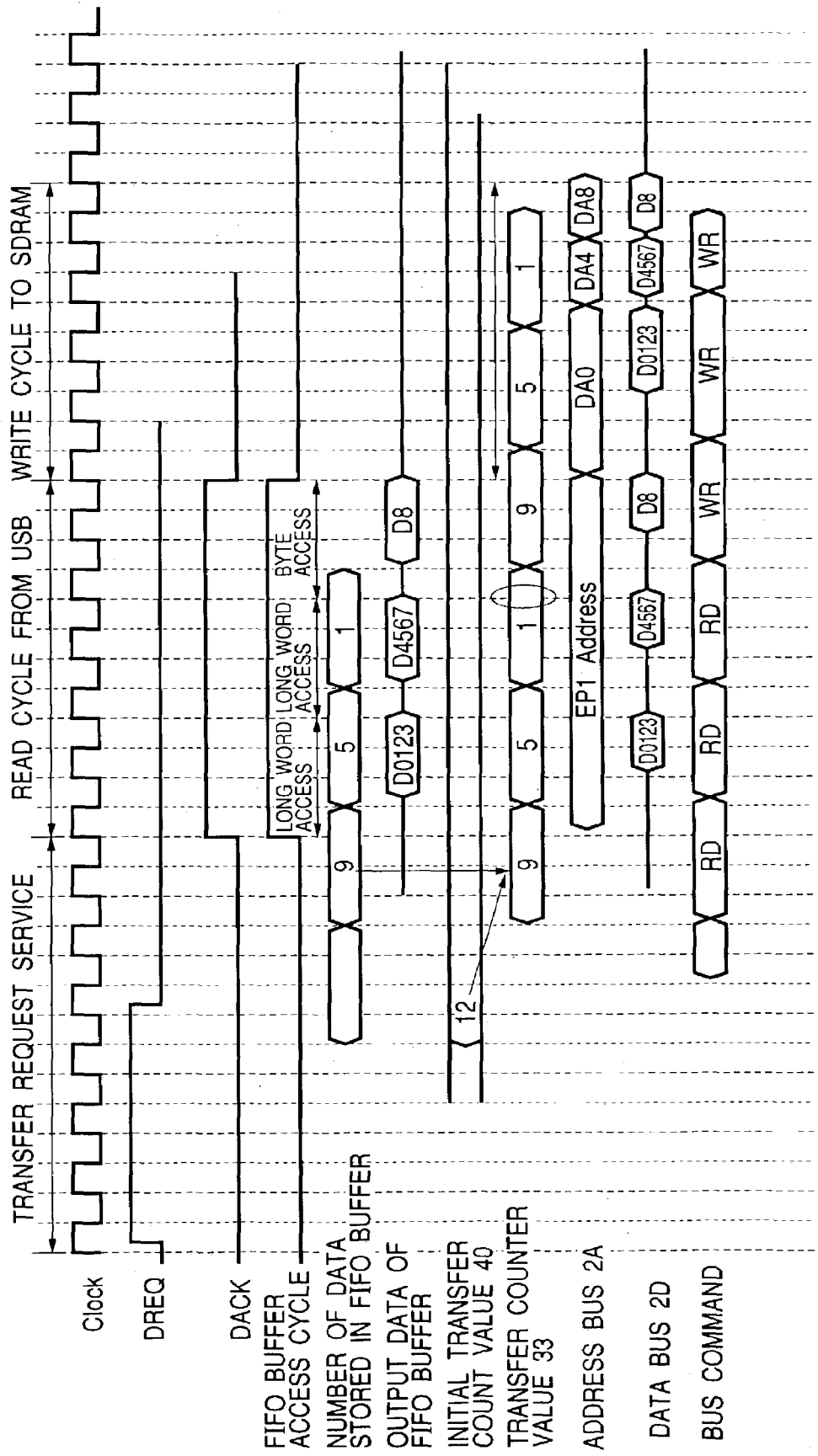
FIG. 10 is a timing chart showing an example of operation timing of data block transfer from a USB interface circuit to SDRAM wherein transfer units are switched in the course of transfer.

FIG. 10 shows an example of operation timing of data block transfer from the USB interface circuit to the SDRAM wherein transfer units are switched in the course of transfer. The number of pieces of data stored in buffer obtained from the buffer pointer 66 is 9, and the initial value of transfer count set in the register 40 is 12. The comparison selection circuit 67 compares both, and loads 9 to the counter 33 as an initial value. The EXDMAC 10 supplies an address signal EP1 indicating the selection of a relevant module to the USB interface circuit 15, which is a transfer source, and thereby causes data to be successively outputted to the data bus 2D from the FIFO buffer 60. The initial value of transfer size is the long word. The transfer control circuit 35 first outputs long word data D0123, and then long word data S4567 to the data bus 2D. At this point, data remaining in the FIFO buffer 60 is only D8, denoting that the number of pieces of remaining data is one, and when the transfer control circuit 35 detects that the number of pieces of data held in the FIFO buffer 60 becomes smaller than the transfer unit (long word), it switches the last transfer unit to the transfer unit of byte and outputs the data D8 to the data bus 2D. The data D0123, D4567, and D8 successively outputted are successively stored in the data buffer area 6BUF of the RAM 6 as described previously.

In the control of data transfer to the transfer destination, the first transfer destination address is an even number address DA0. Accordingly, the initial value of data transfer size is long word, and long word data D0123 and D4567 are successively outputted to the data bus 2D from the RAM 6, and then written to the transfer destination. When the transfer control circuit 35 detects that the number of pieces of data to be transferred becomes smaller than the transfer unit (long word), it switches the last transfer unit to the transfer unit of byte and outputs corresponding data D8 to the data bus 2D from the RAM 6. As described above, since the transfer source in the above data transfer is not a memory but an input-output circuit such as USB, control depending on whether the transfer source address is even or odd is unnecessary, while, since the transfer destination is a memory such as SDRAM, whether the transfer destination address is even or odd is taken into account.

Thus, when an odd number of bytes of data are to be transferred, not all of the data needs to be transferred in bytes, which are a minimum unit of data transfer, making it possible to prevent deterioration in data transfer efficiency.

Figure 11:
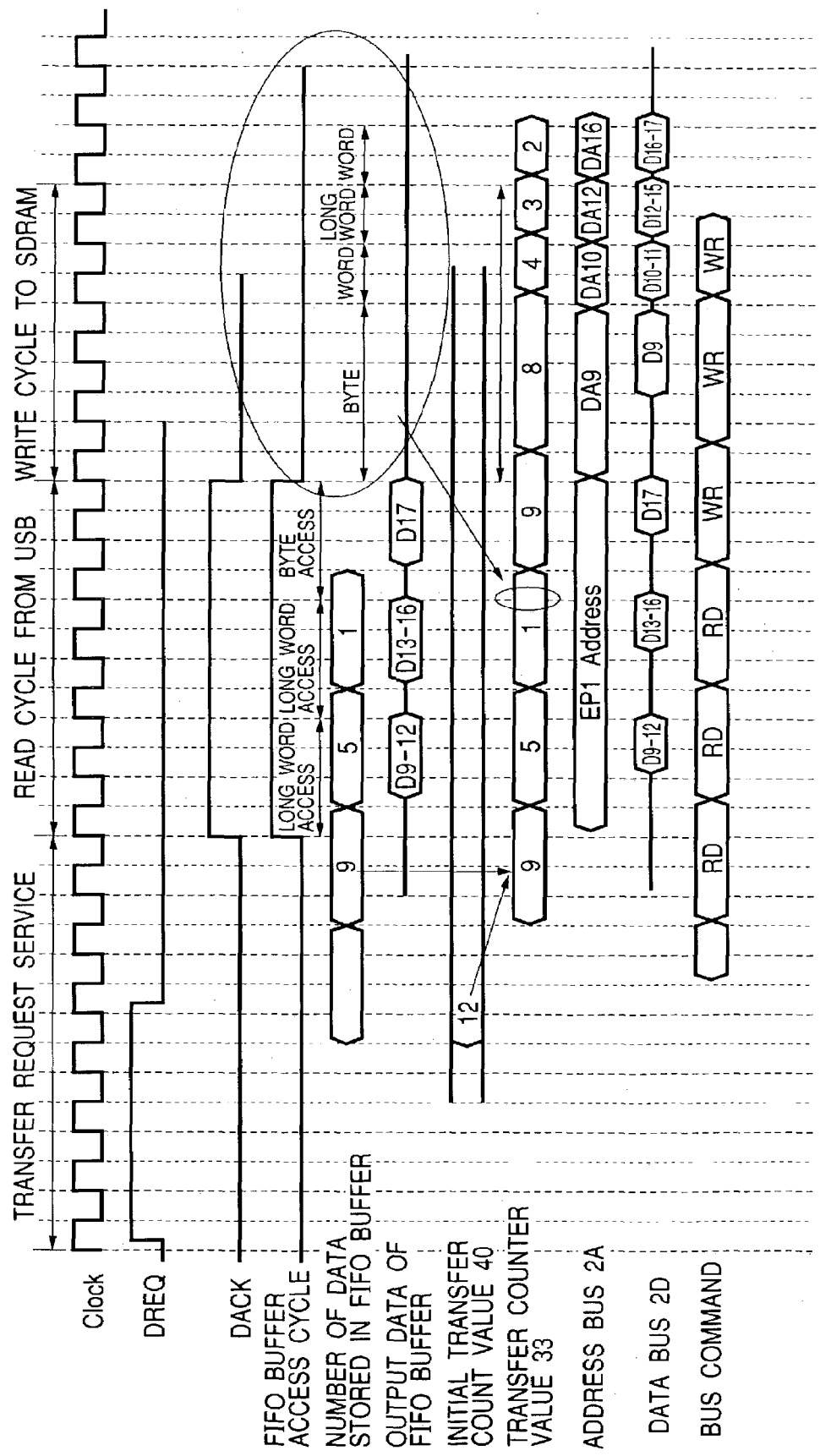
FIG. 11 is a timing chart showing another example of operation timing of data block transfer from a USB interface circuit to SDRAM wherein transfer units are switched in the course of transfer.

FIG. 11 shows another example of operation timing of block transfer from the USB interface circuit to the SDRAM wherein transfer units are switched in the course of transfer. The example of FIG. 11 is different from FIG. 10 in that a transfer destination address begins in an odd address. The read operation from USB, which is a transfer source, is the same as that in FIG. 10. Data transfer units are switched in the order of long word, long word, and byte so that data D9 to D17 are temporarily stored in the data buffer area 6BUF of the RAM 6.

In the control of data transfer to the transfer destination, the first transfer destination address is an odd address DA9. The initial value of transfer unit is long word. The data transfer control circuit 35 uses a transfer unit having a minimum number of pieces of data because a transfer target address is an odd address, and first transfers data D9 to the transfer destination. At this point, the next transfer destination address is an even address DA10, which does not match an address interval of the transfer unit long word. That is, addresses matching the address interval are the addresses of multiples of 4 such as DA0, DA4, DA8, and DA12. Accordingly, the data transfer control circuit 35 changes the number of pieces of data of the transfer unit to word according to the transfer destination address, and transfers word data D10-11 (D10, D11) to the next transfer destination address DA10. The next transfer destination address is an even address DA12, which matches the address interval of long word, which is a transfer unit. Therefore, the data transfer control circuit 35 changes the number of pieces of data of transfer unit to long word, and transfers long word data D12-15 to the next transfer destination address DA12. Last, since the number of pieces of data is 2, the number of pieces of data of transfer unit is changed to word, and word data D16-17 are transferred to the last transfer destination address DA16.

Thus, when an odd number of bytes of data are to be transferred and a transfer destination address begins in an odd address, not all of the data needs to be transferred in bytes, which are a minimum unit of data transfer, making it possible to achieving high data transfer efficiency.

Figure 12:
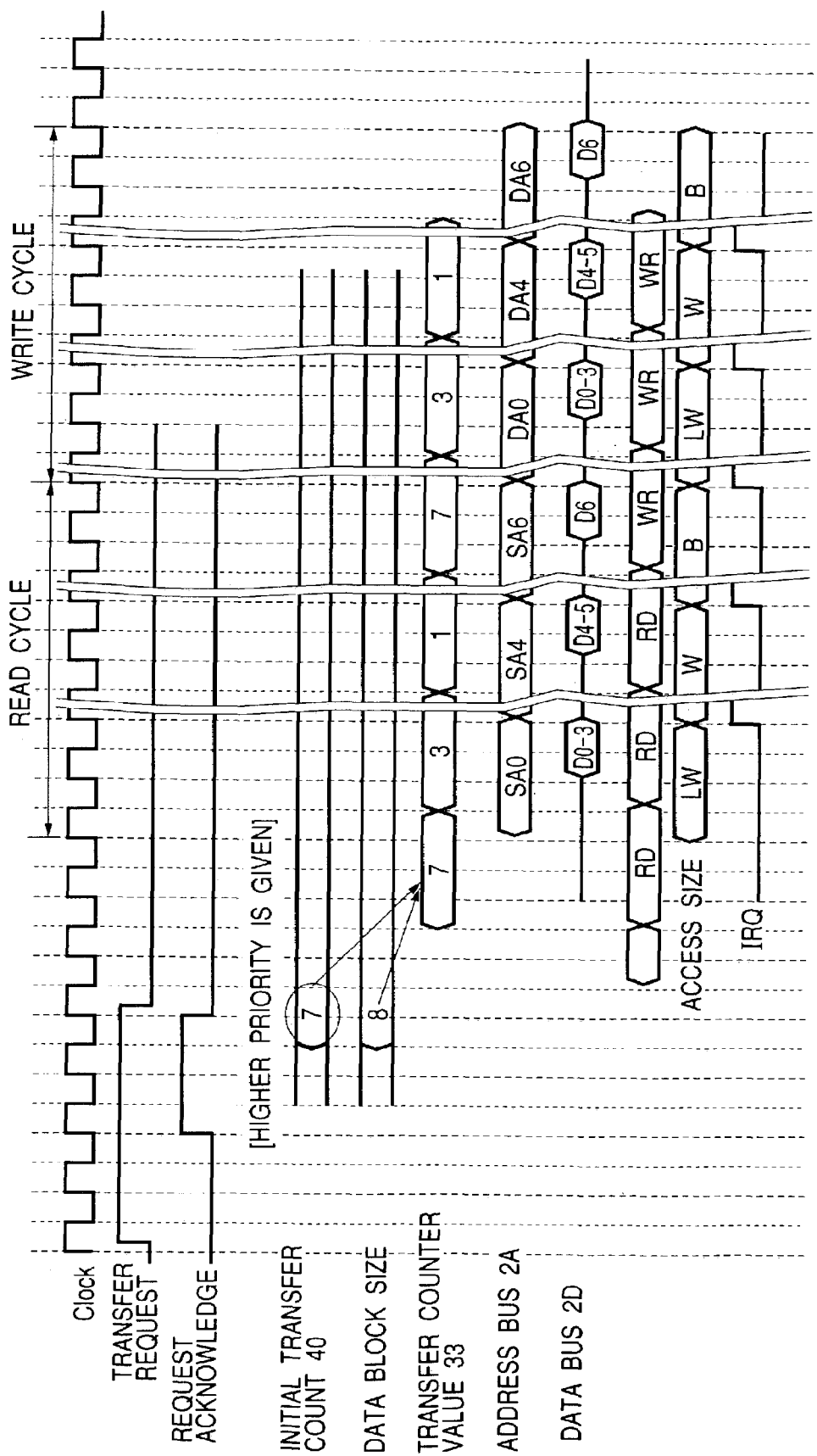
FIG. 12 is a timing chart showing an example of inter-memory transfer of block data.

FIG. 12 shows an example of inter-memory transfer of block data. The initial value of transfer count is long word. The initial value of transfer count is 7 and data block size is 8. For example, high priority is assigned to a transfer count initial value, which is used as the initial value of the counter 33. Transfer source addresses, with an even address SAO as a starting point, are read first in long word by the transfer control circuit 35, and then transfer units are changed to word and byte one after another according to the number of pieces of remaining data. Read data from the transfer source like the foregoing, is temporarily stored in the data buffer area 6BUF of the RAM 6. The start address of the transfer destination is also an even address DA0, and data to be transferred, temporarily held in the RAM 6, is transferred to the transfer destination first in long word by the transfer control circuit 35, and then transfer units are changed to word and byte one after another according to the number of pieces of remaining data.

In this example, when a data transfer unit is changed, the transfer control circuit 35 can output an interrupt signal IRQ to the CPU 3. The control register 36 is provided with an interrupt enable bit (not shown), and when the interrupt enable bit is set, the interrupt signal IRQ can be outputted. Actually, the interrupt signal IRQ passes through the interrupt controller 13. Thereby, the CPU 3 can perform processing defined in an interrupt processing program. For example, when the setting of data transfer control conditions for the EXDMAC 10 needs to be changed to change a data transfer unit, the CPU 3 can do it. In the foregoing description, such setting change has been made with the control logic of the transfer control circuit 35. It is also possible to entrust such control to the CPU 3. In this case, since it becomes necessary to perform additional processing such as status saving that accompanies bus right transfer and CPU 3 instruction execution order change, in a timing chart shown in FIG. 12, cycles (not shown) for the additional processing are inserted in read cycle and write cycle. Furthermore, although not shown, when a transfer unit is changed or the CPU 3 receives an interrupt, subsequent data transfer can be controlled by the CPU 3. For example, the CPU 3 acquires necessary data transfer control information from the EXDMAC 10 and the like, and continues subsequent data transfer on a byte basis. In processing or a system in which the occurrence of an event to change a transfer unit midway is defined as exceptional, there may be cases where the CPU 3 must perform error processing or exceptional processing in response to such an event. Such cases can be supported.

The invention made by the inventor has been described in detail based on preferred embodiments. It goes without saying that various modifications may be made without departing from the sprit and scope of the invention.

For example, circuit modules incorporated in the data processor are not limited to those in FIG. 2 and may be changed. The data processor is not limited to a configuration in which plural data transfer control devices are incorporated. It is inevitable that a data transfer control device according to the present invention has a function for controlling data transfer among circuit modules within the data processor.

A data transfer control device included in the data processor of the present invention may be changed as required without being limited to the configuration and designation of the EXDMAC. The capacity of the RAM and the size of the RAM area control register 41 described based on FIGS. 3 and 4 are only examples and may be changed as required.

The invention made by the present inventor has been described with respect to application of the invention to data processors such as single-chip microcomputers, which are an application field thereof. However, the present invention, without being limited to such a kind of data processors, can be widely applied to application-specific data processors of system on-chip configurations including CPU and data transfer control devices, and the like. The term data processor is equivalent to microcomputer, microprocessor, and data processing device.

Briefly described below are the effects obtained by the representative examples of the invention disclosed in this application.

Transfer efficiency of program data can be increased without little increasing physical circuit scales.

Contradiction between continuous data transfer count by DMAC and continuous data transfer count permitted by peripheral circuits can be eliminated.

Provision can be made for contradiction between the number of pieces of data to be transferred and transfer units, and data transfer to odd addresses.

What is claimed is:

1. A data processor comprising:
a central processing unit; and
a data transfer control unit including an address register for storing a transfer address,
wherein the data transfer control unit transfers data according to a transfer unit size selected from a plurality of transfer unit sizes,
wherein, when the address register contains an odd address as an initial value, the data transfer control unit transfers data according to a different transfer unit size that is smaller than the selected transfer unit size, and
wherein, when the data transfer control unit determines that a remaining quantity of data to be transferred is smaller than the selected transfer unit size, the selected transfer unit size is switched to a smaller transfer unit size selected from the plurality of transfer unit sizes.

2. The data processor according to claim 1, wherein the data transfer control unit performs the switching to the smaller transfer unit size.

3. The data processor according to claim 1, wherein the data transfer control unit requests an interrupt, and
wherein the central processing unit performs control to switch to the smaller transfer unit size in response to the interrupt request.

4. The data processor according to claim 3, wherein the data transfer control unit transfers the remaining quantity of data according to the smaller transfer unit size.

5. The data processor according to claim 3, wherein the central processing unit transfers the remaining quantity of data according to the smaller transfer unit size.

6. The data processor according to claim 1, wherein the determination that the remaining quantity of data to be transferred is smaller than the transfer unit size includes evaluating a buffer pointer external to the data transfer control unit.

7. The data processor according to claim 1, wherein the determination that the remaining quantity of data to be transferred is smaller than the transfer unit size includes evaluating a counter within the data transfer control unit.

8. The data processor according to claim 1, wherein the data transfer control unit is a DMA controller.

9. The data processor according to claim 8, wherein the switching to a smaller transfer unit size occurs during the course of data transfer.

10. The data processor according to claim 1,
wherein the data transfer control unit transfers data using the selected transfer unit size after transferring data using the different transfer unit size.

11. The data processor according to claim 1,
wherein the address register stores a transfer destination address.

12. The data processor according to claim 1,
wherein the plurality of transfer unit sizes includes a first unit size, a second unit size and a third unit size smaller than the second unit size, and
wherein the first unit size is larger than the second unit size.

13. A data processor, comprising:
a central processing unit; and
a data transfer unit,
wherein the data transfer unit includes a transfer address register, and transfers data according to a data transfer size selected by the central processing unit from a plurality of data transfer sizes,
wherein the plurality of data transfer sizes includes a first data size, a second data size smaller than the first data size and a third data size smaller than the second data size,
wherein the data transfer unit switches a data transfer size from the selected data transfer size to the third data size according to an address stored in the transfer address register, and
wherein the data transfer unit is operable to transfer, in response to a single data transfer request, data according to the selected data transfer size after transferring data according to a smaller data transfer size.

14. The data processor according to claim 13,
wherein, when the transfer address register contains an odd address, the data transfer unit is operable to transfer data according to the smaller data transfer size.

15. The data processor according to claim 13,
wherein, when the first data size is selected as the data transfer size and the transfer address register contains an odd address, the data transfer unit transfers data according to the second data size and then transfers data according to the first data size.

* * * * *